Nov. 3, 1964   B. E. WILLIAMS   3,155,123
REINFORCED RAMIE SHROUD
Filed Feb. 23, 1962
FIG. I.
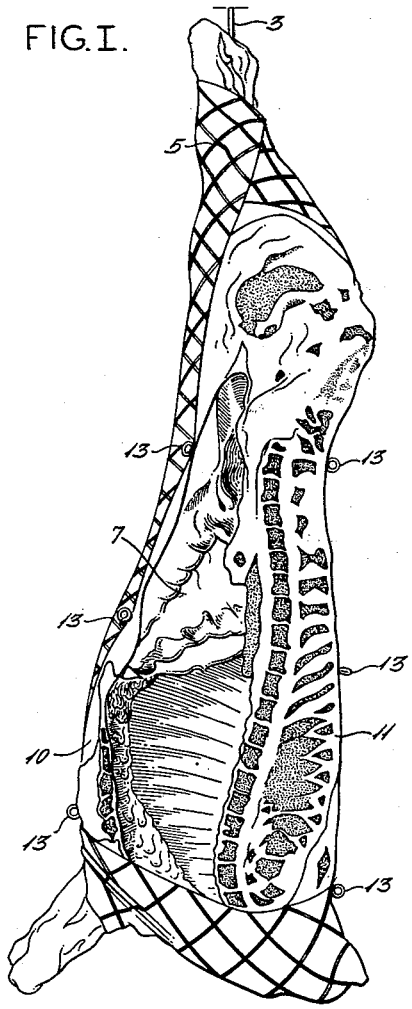
FIG. II.
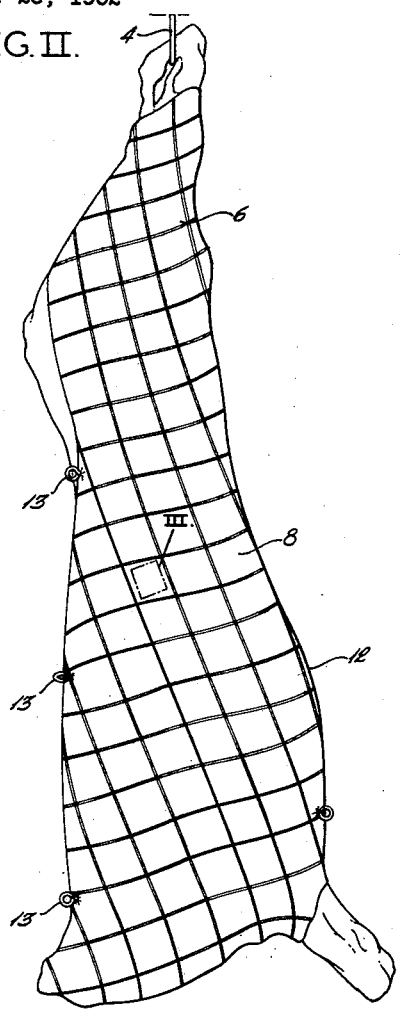
FIG. III.
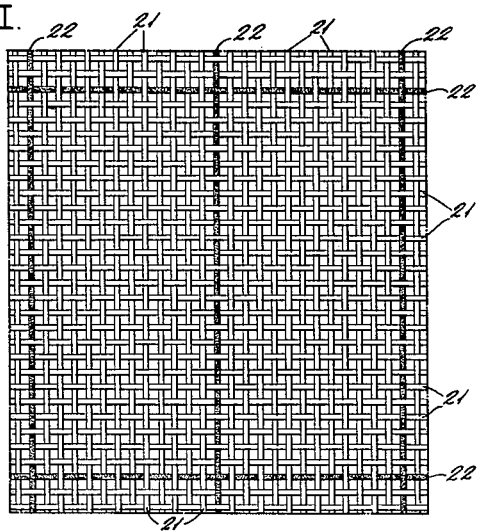
INVENTOR:
BEVERLY E. WILLIAMS
BY
Howson & Howson
ATTYS.

3,155,123
REINFORCED RAMIE SHROUD

Beverly E. Williams, La Grange Park, Ill., assignor, by mesne assignments, to Hodges Research and Development Company, New York, N.Y., a corporation of California
Filed Feb. 23, 1962, Ser. No. 174,968
11 Claims. (Cl. 139—426)

This invention relates to shrouds for animal carcasses, and more particularly, provides a novel solution to the problem of skewer tearing of such shrouds.

In the meat packing industry, it is customary to wrap meat carcasses, especially sides of beef, immediately after the slaughtering and dressing operations in wet cloths called meat or beef shrouds while the skinned carcasses are being chilled. The shroud absorbs blood and tends to smooth and whiten the outer fat surface. The shroud is a rectangular piece of cloth. To apply it to the carcass, it is wetted, usually with a 20° salometer brine solution, kept at a temperature of about 120° F. and then wrapped tightly around the carcass. Then skewer-type metal clothing pins are thrust through the shroud into the carcass to hold it in place. After the carcasses have chilled to ambient temperature, the shrouds are removed, laundered and re-used.

Since the shroud is pulled tightly around the carcass while it is being pinned in place, so that it will smooth the surface fat by compressing it as tightly as possible, the material of the shroud is subjected to substantial stress. It therefore must be made of a sturdy fabric. The practice in the art generally has been to use a heavy, tightly-woven cotton cloth material for meat shrouds. Characteristically, the shrouds are Osnaburg cotton of 2.11 weight (2.11 yards to the pound of cotton), having a thread count (warp and weft) of about 36 to 40 threads per inch. The tight weave of such a fabric is essential to giving the shroud enough strength to enable it to be fitted smoothly and tightly over the animal carcass. However, because of the close weave, when the shroud is pinned to the carcass by the skewers, the skewers tend to break the threads of the cloth. A wide (4 inch) selvage is generally woven into the material in an attempt to give extra strength to the area which the skewers often penetrate, this is not very effective since the placement of the shroud on carcasses of varying size is most frequently such that the pins must be thrust through the body of the cloth, rather than the selvage, to hold the shroud on properly.

Once threads have been broken and split by a skewer, the stretching and pulling of the shroud the next time it is being fitted onto a meat carcass or side results in runs and tears started by the broken threads. Laundering tends to weaken the shrouds, and since cotton is weaker wet than dry, and the shrouds are wet with heated brine when applied to the carcasses, such tears appear rapidly after the shroud has been in use for a short time. More shrouds "tear out," that is, have to be discarded because they are torn, than wear out. The average life of a standard cotton shroud like that described above is only about 40 uses.

A recent improvement on the above-described state of the art consists in using shrouds comprising ramie for shrouding animal carcasses, as disclosed and claimed in my Patent No. 2,824,011. Ramie is considerably stronger than cotton, and is stronger wet than dry, in contrast to cotton. With ramie, I found it possible to use a looser weave than with cotton, and to keep shrouds in use at least twice as long as cotton. The ramie shrouds have, in fact, lasted up to ten times as long.

Ramie, of course, is a tropical fiber, while cotton is a native fiber. The equipment for spinning cotton into thread is generally available, while equipment for ramie spinning and weaving is not available in the United States. These factors and others make ramie shrouds more expensive to produce than cotton. I therefore have investigated methods of combining ramie with cotton. Ramie and cotton fibers differ in staple length; ramie has fibers up to 6 inches long, whereas, cotton fibers are only about ¾ to about 1½ inches long. Spinning processes, however, require using fibers having about the same length. Therefore, to spin a ramie-cotton mixture into yarn, it was found necessary to reduce the ramie staple length to that of cotton. This, I found, detracted from the desirable qualities of the ramie, and the mixed cotton-ramie yarns when made into cloth had to be given a close weave about like that of an all-cotton shroud in order to have the required strength. Such shrouds were found to be as susceptible as the standard all-cotton shrouds to tearing as a result of skewer pin breaks in the threads.

It is an object of this invention to provide a novel, improved animal carcass shroud, and a novel, improved method of clothing animal carcasses using such shroud.

A particular object of this invention is to provide a novel cotton-comprising meat shroud which has improved resistance to tearing out; and a novel method of clothing animal carcasses wherein tearing out of a cloth-comprising meat shroud is minimized.

These and other objects will become evident from a consideration of the following specification and claims.

I have now found that I can achieve the above-stated objects by providing and clothing carcasses with meat shrouds having about 20 to about 30 yarns (threads) per inch in the warp and in the fill, consisting first, of threads selected from the group consisting of cotton or linen, and second, threads consisting of a yarn, ramie, for instance, different from said first thread yarn and having high wet strength, said second threads occurring in the warp at the rate of from 2 to 10 per inch, and in the fill, at the rate of from 1 to 2 per inch, the remainder of the threads in the weave consisting of said first threads. By calculation from the foregoing figures, the proportion of first-yarns will range from about 70% to about 95%, and the proportion of second-yarns will range from about 5% to about 30%.

The said second threads having high wet strength will preferably be ramie.

As will appear hereinafter, the threads of the shroud may be treated with a modifier material.

Reference may be made to the drawing in which:

FIGURES I and II are general perspective views of sides of beef clothed with the shrouds, and FIGURES III is a schematic illustration, on a magnified scale, of the weave of the above-described novel shroud.

The stated shroud structure has such an open weave that even large metal skewers tend to penetrate between the threads rather than thrus through and break them. If the skewers do break threads, and a tear results, the tear does not extend far. The reinforcing, high-wet-strength ramie thread resists tearing and this stops the tear from continuing further. Thus, these novel shrouds made, for example, from a majority of cotton and a minority of ramie threads, have a useful life which is substantially greater than that of a cotton shroud, and indeed, one which may approach that of an all-ramie shroud, thus achieving the advantages which as noted above, it was not found possible to attain with blended ramie-cotton fibers. Moreover, this type cloth can be woven on cotton systems available in the United States.

In practicing the present invention, the first threads, used to provide the major portion of the structure of the shroud will preferably be cotton. The alternative to cotton for this purpose is linen. However, commercial consideration will generally dictate the use of cotton.

The second threads will consist of a filament-forming material having a high wet strength. The material of choice in this connection is ramie. In a 25–26 square weave, in a cloth weight of about 2.8 yards per pound, for example, a dry ramie fabric has a tensile strength of 80–90 pounds per inch (grab method, ASTM D39–44), and it increases in strength when wet. Alternatively, a ramie/linen blend may be used to make the second thread, or the second thread may even consist of linen itself. The second thread could also consist of a less absorptive material of the stated wet strength; for example, it could be a filament of a metal acceptable as a food-contacting material, such as aluminum wire; or a synthetic fiber like nylon. However, it is observed that a pronounced difference in absorptivity between the first thread and the second thread results in appearance of mesh-like markings on the surface of the carcass clothed in the shroud. An all-ramie fiber is most preferred for the second thread.

As noted above, one of the purposes of clothing carcasses in shrouds during chilling is to produce an attractive surface appearance, in which the fat covering will look smooth and white. When a shroud is made of different thread materials, as it is in accordance with the present invention, I have found that certain precautions are desirably observed to maximize this result. In the first place, the shrinkage of the different thread materials may differ significantly. With the laundering and wetting processes shrouds are subjected to before the carcasses are clothed with them, shrinkage develops rapidly. Thus, with an original shroud length of 108 inches, a ramie shroud shrinks 3¼ inches in 12 launderings, while an Osnaburg cotton shroud shrinks 17¾ inches. Differential shrinking rates of threads in a shroud as herein provided would result in puckering of the shroud surface, preventing attainment of the complete contacting of the carcass needed to effect smoothing of the fat. Therefore, I find it advantageous to shrink the threads before the shroud is woven from them thereby avoiding or at least minimizing differential shrinking rates. Adequate preshrinking will equalize the threads so that shrouds woven from preshrunk threads of ramie and of cotton, for example, will stay smooth, even through repeated launderings.

Another factor affecting surface appearance of the carcasses is the tendency of the thread fibers to lint and to deposit fiber fragments on the carcass surface. Ramie is rather a brittle fiber and has this tendency, especially when new shrouds including ramie threads are first put in use. I have discovered that I can reduce or eliminate lint and fiber fragment deposition from the shrouds of my invention by treatment with a heat-curing resinous material adapted to stabilize the thread structure. Use of such treatment has been known in the textile art hitherto in achieving wrinkle-resistant, drip-dry fabrics. The heat-curable aminoplast resins used commercially have included the urea-formaldehyde type, the melamine-formaldehyde type and the methylated ethylene urea type, among the more important resins to date. Many others have been suggested for this use: triazines, such as methoxymethylated melamine; triazones, such as tetrahydro-s-triazin-2-(1H)-ones; epoxides, such as vinylcyclohexene dioxide; acetals, such as modified glycol acetals; quaternary ammonium derivatives of bis-chloromethyl ethers; divinyl sulfone derivatives; tris-1-aziridinyl phosphine oxide (APO), and so forth. The technology of these resins is well understood in the textile art. For example, to make a suitable precondensate of melamine and formaldehyde, one mol of melamine is reacted with 4 mols formaldehyde as a 37% aqueous solution, by refluxing at 80° C. while holding the mixture at pH 9 by adding 25% aqueous caustic soda, for 5 minutes. Diluting the resulting solution with water to a 16% solids concentration gives a liquid bath adapted for application to a fabric. A cure catalyst such as 2-amino-2-methyl propanol phosphate is added to the bath, the bath is applied to the fabric, and the fabric is stretched so that it is unwrinkled and heated to cure the resin, at 300° F. A neutralizing wash with soap and sodium carbonate completes the process. Treatment with the other resins is effected similarly.

According to the present invention, the fiber-stabilizing treatment will be applied to the thread or yarn itself, rather than to the woven fabric. In other respects, the procedure followed will be conventional in the textile art, as described above. A heat-curable aminoplast resin, such as the melamine-formaldehyde type discussed above, is well adapted for this purpose. The treated ramie yarn not only has little or no tendency to deposit lint and fragments on the surfaces it contacts, but also resists soiling. After treatment, the yarn will then be woven as the second thread into a shroud of the construction described above, providing a superior shroud for clothing animal carcasses.

Another method of treating ramie-containing fabric to reduce its brittleness is by applying thereto an aqueous solution of one or more edible, water-soluble materials selected from the class consisting of water-soluble cellulose ethers, gelatin, and water-soluble polyhydric aliphatic alcohols of from 3 to 6 carbon atoms containing at least 3 alcoholic hydroxyl groups. Exemplary of the stated cellulose ethers is carboxymethylcellulose. Exemplary of the stated alcohols is glycerine. As disclosed in my copending application S.N. 15,069, filed March 15, 1960, I have made the discovery that such solutions, with or without the inclusion of salt, have many advantages as a substitute for the conventional brine solution used to wet shrouds before they are applied to meat carcasses. These include reduction of the tendency of ramie to deposit lint on the carcasses and of the tendency of relatively open weaves such as a 25 square weave to leave a mesh-like mark on the carcass surface. Such solutions also, in a sense, increase the absorptivity of threads comprising fibers such as cotton, linen and ramie: that is, they decrease the rate at which the wet shroud cloth dries out after being applied to the carcass. Illustrative of a solution useful for this purpose is a 20° salometer brine containing 2 oz./gal. of a cellulose glycolate in which about 1.2 of each 3 hydroxy groups of the cellulose are replaced by glycolic acid ether groups, 1 oz./gal. of an edible gelatin, and 5% by weight glycerine.

The shroud will be prepared by weaving the selected first and second threads into fabric so as to produce the above-stated structure. That is, the weave will include from about 20 to about 30 yarns (threads) per inch in the warp and in the fill, consisting of the stated second thread every 1/10 to ½ inch in the warp and every 1 to 2 inches in the fill, and the remainder, the stated first threads. A weave of about 26 square is suitable. Then suitably in the warp every 13th thread and in the fill, every 26th thread will be ramie or other second thread, and all the other threads will be cotton or linen. It has been found that less of the stronger threads are needed in the fill because the warp threads take most of the skewer pull, which is lateral, i.e. from side to side of the cloth rather than from top to bottom.

FIGURE III is an enlarged schematic view of a portion of the shroud showing the stated first yarns 21, providing the bulk of the shroud structure, and the stated second yarns 22 spaced in the weave as specified above.

The yarn from which the fabric is woven may vary somewhat as to size, and may range between about 3000 and about 4000 yards per pound. A particularly suitable yarn is one containing about 3200 yards per pound.

Selvage edges, preferably one inch wide instead of four inches wide, may be provided along one or both edges of the shroud, such selvage edges having a heavier weave than the above-described body of the shroud. For example, the selvage weave may be twice as heavy as the main body portion, with a 40–60 square weave. The reinforcing second thread will desirably occur at the same relative intervals as in the main body; for example, where it provides every 13th thread in a 26 inch square weave in the body warp, it will provide every 13th thread in a 52 square weave in the selvage, and so forth. The finished shroud will be a generally rectangular cloth, of a size adapted to cover the exterior of meat carcasses. For use to clothe sides of beef, its dimensions are suitably between about 72 inches and about 120 inches, and usually about 108 inches in length, and between about 36 inches and about 52 inches, usually about 40 inches wide. The selvage can be up to 6 inches wide; with the type of construction here provided, it can be as narrow as 1 inch or less, however, since skewer tears in the body of the fabric are not the hazard that they are in the conventional cotton shroud.

In a further embodiment of the invention the fill could be completely devoid of the second threads having high wet strength such as ramie. That is 100% of the fill could be cotton or linen with the high wet strength thread materials being included only in the warp, thus resulting in a further saving in cost of this shroud material. This embodiment of the invention would still result in a highly tear resistant shrouding material because the metal skewers used in clothing or shrouding carcasses pull against and tear the up-and-down or warp thread. There is a minimum of pull against the crosswise threads because the skewers are inserted near the edges of the cloth and pulled laterally. By calculation from the figures given hereinabove, when the fill is devoid of second yarns, the proportion of first yarns in the shroud will range from about 75% to about 96.7% and the proportion of second yarns will range from about 3.3% to about 25%.

For clothing a meat carcass in accordance with the invention, the shroud will be wrapped tightly and smoothly around the skinned surface of the carcass. It can be tied or otherwise fastened as with the conventional self-binding tuck, to the hind-shanks. At the chine bone (backbone) and visceral cavity, and elsewhere if desired, the shroud will be secured in position by pins or skewers thrust through the shroud into the carcass.

Because of the added strength of ramie type shrouds and particularly of the instantly described shrouds a further improvement in clothing carcasses is accomplished. That is, it has been found that the herein claimed shrouds can be skewered or pulled more tightly to the carcass than shrouds used previously. This results in a smoother carcass having the rough, uneven and fiery fat thereon bleached. Moreover, this increased pull resulted in the need for a heavier, thicker, stronger clothing pin or skewer since conventional skewers were found to bend under the increased tension. Thus, a heavier skewer to which more leverage could be applied was adopted to insure that the tightened wrapping of the carcass with the herein claimed shrouding material could be achieved. The herein described shrouding material withstood the use of the larger skewer with no noticeable increase in tearing, whereas tears became rampant when these heavier skewers were used on cotton cloths.

In FIGURES I and II, two sides of beef are shown suspended from conventional hooks 3 and 4. The shrouds 5 and 6 are shown wrapped snugly and smoothly about the skinned surfaces of the carcass, however no strings or ties are used at either hindshanks or foreshanks, the extremities of which are not covered. The shrouds are also secured to the edges 10, 11 and 12 of the visceral cavities 7 and 8 as by skewers 13. When whole, round, dressed carcasses such as veal and lamb (not shown) are clothed, a self binding tuck is made at the hindshanks and usually only one skewer is used at the visceral cavity.

The shroud will be moistened with an aqueous solution when it is applied to the carcass. This may be water, or more preferably, a solution of a bactericidal or fungicidal material, a hygroscopic material, or both. Suitably, an aqueous solution of brine containing one or more of an edible water-soluble material selected from a cellulose ether like cellulose glycolate, gelatin and/or a polyhydric alcohol like glycerine, as mentioned above, will be used to moisten the shroud.

Conventional procedures will be followed in leaving the shroud on the carcass until the carcass has become chilled and "set-up" and the surface fat has congealed while the clothed carcass is held in a chilling chamber, and removing the shroud preferably before it dries out completely, to avoid the cloth sticking to the fat, resulting in difficulty in removing the cloth and tearing of the fat and fell covering.

While the invention has been described with reference to various particular preferred embodiments thereof, it will be appreciated that modifications and variations may be made within the scope of the present invention.

What is claimed is:

1. As an article of manufacture, a meat clothing shroud for clothing meat carcasses, in which the body portion, exclusive of selvage, has an open weave in which there are between about 20 and about 30 yarns in the warp and between about 20 and about 30 yarns in the fill, per inch, consisting of a major proportion, from about 70% to about 95%, of first-yarns selected from the group consisting of cotton and linen, and a minor proportion, from about 5% to about 30%, of second-yarns consisting of a yarn different from said first-yarns and having a substantially higher wet strength than said first-yarns, said second-yarns occurring in the warp at the rate of from 2 to 10 per inch and in the fill at the rate of from 1 to 2 per inch, said first-yarns and said second-yarns having a size ranging between about 3000 and about 4000 yards per pound.

2. The woven shroud of claim 1, in which said first- and second-yarns are pre-shrunk before said shroud is woven therefrom.

3. The woven shroud of claim 1, in which said second-yarns are of ramie.

4. The woven shroud of claim 1, wherein said first-yarns are pre-shrunk cotton and wherein said second-yarns are pre-shrunk ramie.

5. The woven shroud of claim 1, wherein said first-yarns are pre-shrunk linen and wherein said second-yarns are pre-shrunk ramie.

6. The shroud of claim 3 wherein the weave of said shroud is about 26 square, and wherein said ramie yarns provide every 26th yarn in the fill and every 13th yarn in the warp.

7. The shroud of claim 3 wherein said ramie yarns contain a cured aminoplast resin therein.

8. As an article of manufacture, a meat clothing shroud for clothing meat carcasses, in which the body portion, exclusive of selvage, has an open weave in which there are between about 20 and about 30 yarns in the warp and between about 20 and about 30 yarns in the fill, per inch, consisting of a major proportion, from about 75% to about 96.7%, of first-yarns selected from the group consisting of cotton and linen, and a minor proportion, from about 3.3% to about 25%, of second-yarns consisting of a yarn different from said first-yarns and having a substantially higher wet strength than said first-yarns, said second-yarns occurring in the warp at the rate of from 2 to 10 per inch and said first-yarns and said second-yarns having a size ranging between about 3000 and about 4000 yards per pound.

9. The shroud of claim 8 wherein said second-yarns are of ramie.

10. As an article of manufacture, a meat clothing shroud for clothing meat carcasses, in which the body portion, exclusive of selvage, has an open weave consisting of a major proportion, from about 70% to about 95%, of first-yarns selected from the group consisting of cotton and linen, and a minor proportion, from about 5% to about 30%, of second-yarns consisting of a yarn different from said first-yarns and having a substantially higher wet strength than said first-yarns, said second-yarns occurring in the warp at the rate of from 2 to 10 per inch and in the fill at the rate of from 1 to 2 per inch, said first-yarns and said second-yarns having a size ranging between about 3000 and about 4000 yards per pound.

11. The shroud of claim 10 wherein said second-yarns are of ramie.

References Cited in the file of this patent

UNITED STATES PATENTS

| | | |
|---|---|---|
| 2,044,361 | McMenamin | June 16, 1936 |
| 2,235,798 | Collings et al. | Mar. 18, 1941 |
| 2,314,300 | Williams et al. | Mar. 16, 1943 |
| 2,371,967 | Lohner et al. | Mar. 20, 1945 |
| 2,423,428 | Pollard | July 1, 1947 |
| 2,564,454 | Stohlman | Aug. 14, 1951 |
| 2,594,210 | Potter | Apr. 22, 1952 |
| 2,682,097 | Wade | June 29, 1954 |
| 2,699,396 | Francis | Jan. 11, 1955 |
| 2,824,011 | Williams | Feb. 18, 1958 |
| 2,979,410 | Parlour | Apr. 11, 1961 |
| 3,041,184 | Hartshorne | June 26, 1962 |

FOREIGN PATENTS

| | | |
|---|---|---|
| 173,244 | Great Britain | Dec. 28, 1921 |
| 776,720 | Great Britain | June 12, 1957 |
| 1,104,557 | France | June 15, 1955 |